Oct. 15, 1929.    A. W. SCHORGER    1,732,069

DRY CELL WITH EXTENSIBLE COATING

Filed May 27, 1927

A. W. Schorger  INVENTOR

BY

Pennie, Davis, Marvin & Edmonds
ATTORNEYS

Patented Oct. 15, 1929

1,732,069

UNITED STATES PATENT OFFICE

ARLIE W. SCHORGER, OF MADISON, WISCONSIN, ASSIGNOR TO BURGESS BATTERY COMPANY, OF MADISON, WISCONSIN, A CORPORATION OF WISCONSIN

DRY CELL WITH EXTENSIBLE COATING

Application filed May 27, 1927. Serial No. 194,687.

My invention relates to a method of insulating or coating the cans or other containers of dry cells used especially in "B" batteries or other multiple-cell batteries.

An object of my invention is to provide an insulating coating on the containers of dry cells which will be extensible and will not break when subjected to the pressure caused by the electrolyte of the dry cell expanding through perforations in the container. This lessens the danger of short circuiting in multiple batteries.

The invention is capable of use in connection with cells of the pasted or bag type, or cells of the paper lined type. For the purpose of illustration the drawings show the invention illustrated in connection with a cell of the pasted bag type.

Figure 1:
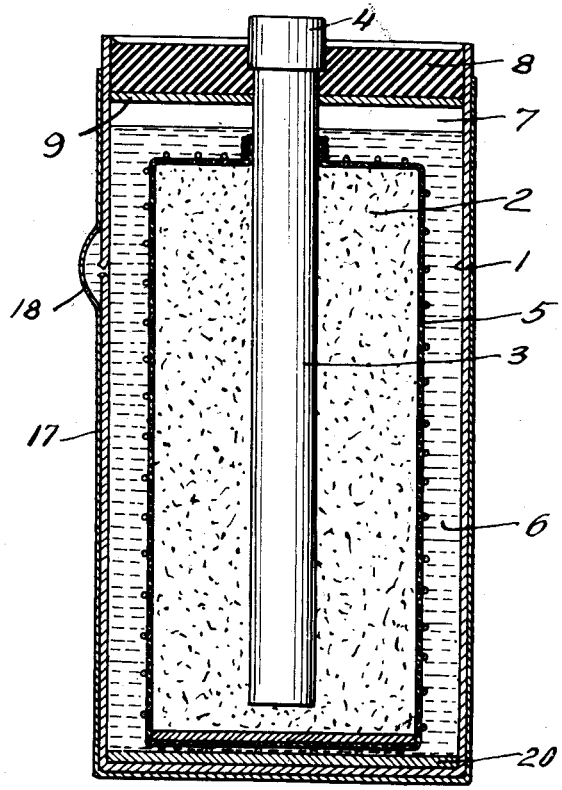
Fig. 1 is a vertical sectional view of a single cell.

An ordinary bag type dry cell consists of a zinc shell 1, which may be seamless as described in U. S. Patent No. 1,375,306, a core 2 of depolarizing mixture of manganese dioxide or other depolarizer, powdered graphite, sal ammoniac, zinc chloride and water, in which is embedded a carbon rod 3 having a brass cap 4. The core may or may not be surrounded by a bibulous envelope 5. The core is set in a gelatinous electrolyte 6 which contacts with the zinc can 1. The gelatinous electrolyte may be that described in U. S. Patent No. 1,292,764. It usually consists of sal ammoniac, zinc chloride, a cereal such as starch, and water. An expansion space 7 may be left between the top of the core 2 and electrolyte 6. A seal 8 of sealing wax or pitch resting on washer 9 completes the cell.

Figure 2:
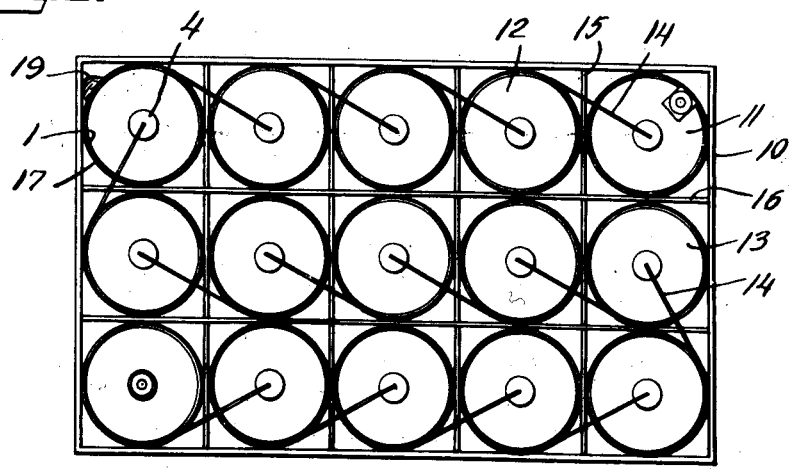
Fig. 2 is a plan view showing a number of cells assembled into a battery.

A plurality of cells, such as are described in the previous paragraph, are usually connected in series for a variety of uses and especially as "B" or "C" batteries in radio sets. The "B" batteries are usually made in convenient units having a voltage of 22½ or 45 volts and are assembled in boxes in which the cells are insulated from each other by suitable partitions which may be made of paper waterproofed by saturating with paraffine or other suitable waterproofing agent. Such an assembly is illustrated in Fig. 2 in which 10 is the container holding a plurality of cells 11, 12, 13 etc., connected in series by wires 14. The cells are insulated from each other by partitions 15 and 16. The individual cells may be further insulated by wrapping in a sheet of paraffined or other insulating paper as described in U. S. Patent No. 1,408,140. A fusible sealing material, such as sealing wax or pitch, is usually poured over the cells to bind them together.

A multiple cell unit when used in the "B" or "C" circuit of a radio set is usually subject to a low current drain which may vary from less than 1 to as high as 40 milamperes. Such batteries usually discharge their energy intermittently over a period of several months or more depending upon the current drain, hours of daily service, and size of cells in the battery. The slow intermittent discharge of a dry cell usually results in more or less uneven corrosion which is evidenced by the pitting of the zinc, that is, small holes appear in the zinc where the corrosion has been localized. Such pits may appear long before the useful energy of the battery has been utilized. During the discharge of the cell a pressure develops on the interior because of the formation of gases which cannot escape readily through the seal 8. As a result, when the zinc can or other container punctures there may be enough pressure to force a quantity of electrolyte paste or a concentrated zinc chloride solution out through the holes. Since zinc chloride attacks cellulosic materials, even though saturated with paraffine or other saturants such as oils, the zinc chloride in the exuded paste or liquid penetrates the partitions within a few weeks and short circuits the cell and possibly a section of the multiple battery. This short circuiting occurs especially when the puncture occurs where the circumference of the container contacts with the partition. If cell 11 punctures where it touches the vertical partition 15 contacting with cell 12, only cell 11 is short circuited. However, if the puncturing occurs at horizontal partition 16 where cell 13 contacts, nine cells in the two upper horizontal rows are short circuited. The puncturing of horizontal partition 16 is accelerated by the high potential difference between cells 11 and 13. After short circuiting occurs excessive oozing of zinc chloride solution is liable to occur from the punctures. This solution may run to the bottom of the battery and short circuit further cells by bridging between the cells. Since a zinc chloride solution is an excellent electric conductor further short circuiting occurs readily, and the battery is soon ruined.

I have discovered that when an extensible coating, which is resistant to zinc chloride or dry cell electrolyte, is formed on the outside of the zinc can or container or on the side removed from the electrolyte, puncturing of the container may occur without disastrous results, especially in a multiple cell battery. Such an extensible coating 17 is preferably formed of rubber which may be applied by dipping in a solution of rubber or by electrodeposition from rubber latex. Rubber is resistant to the zinc chloride or dry cell electrolyte and is extensible. My experiments show that such a rubber coating is capable of distending a large amount adjacent to the puncture without leaking or breaking as shown at 18 and the exuding solution or paste does not reach the partition or the electrode of the adjacent cell. Although the rubber may be stripped from the metal, it adheres sufficiently to the metal electrode so that the swelling is localized to the area immediately adjacent to the puncture. This adherence is a decided advantage as the zinc chloride will not spread over the entire area of metal covered by the rubber and escape at the edge of the coating. If the puncture occurs next to a partition the extensible coating distends as at 19.

The thin rubber coating may be applied to the exterior of the zinc can by a rubber solution. Suitable solvents are benzene and solvent naphtha and a suitable solution of one in which three to ten grams of rubber is dissolved in 100 cubic centimeters of solvent. Such a solution may be applied e. g. by dipping the container in it and allowing the solvent to evaporate. One or more coats are applied until a film of rubber of suitable thickness is formed. With the usual zinc dry cell can it is not necessary to cover the bottom as a bottom washer 20 or other insulating material prevents electrolytic action at this point.

I have also found that an excellent rubber coating may be obtained by electrodepositing rubber latex onto the exterior of the can. This operation may be carried out in the following manner: The zinc can or the zinc of the finished cell, the exterior of which has been freed from grease, serves as the anode and is immersed nearly to the top in natural rubber latex, containing 30 to 35% rubber stabilized with ammonia. This solution is held in an iron or other suitable vessel which serves as the cathode. Good coatings have been obtained by a direct current at about 110 volts and a current density of 0.05 ampere per square centimeter, though it is not necessary to adhere closely to the above conditions to obtain satisfactory results. After the current has passed for 2 to 5 minutes, the zinc cans are removed and suspended in warm air to permit evaporation of water and the formation of a tough, continuous coating of rubber. In place of electrodeposition a suitable coating can be obtained by dipping the zinc containers one or more times in the rubber latex. In another modification a preformed thin rubber tube may be slipped over the can instead of forming the coating in situ. This tube may be wholly or partially cemented to the can.

The exterior of dry cell zinc cans have from time to time been coated by various materials such as varnish, shellac, paraffin, paint asphaltum, celluloid, nitro-cellulose materials and various combinations of them. These materials have been chiefly used on standard or No. 6 cells of the paper-lined type in which the paste electrolyte 6 of Fig. 1 is replaced by a porous paper liner. When the zinc is punctured in this type of cell there is seldom any exuding of paste or zinc chloride solution due to interior pressure. Under such conditions it is not necessary to have an extensible coating since the more or less brittle coating formed by the above named materials will not be broken when the zinc is punctured. On the other hand, if these materials are used on a pasted type or paper-lined cell where an interior pressure develops the brittle coating is immediately broken when the zinc punctures and therefore is of no benefit. My invention may be applied to both types of dry cells.

I claim:

1. In a battery consisting of a plurality of dry cells unified by inclusion in a hardened mass, means for insulating said cells from each other comprising permanent locally extensible rubber coatings integral with said cells.

2. A dry cell container having a permanent, adhesively sticking rubber coating on the side removed from the electrolyte, said coating adhering sufficiently to said container so that fluids exuding through a puncture in said container are retained in a distention of said coating and localized to the area immediately adjacent to said puncture.

3. A dry cell container having an adhesively sticking locally distensible coating on the side removed from the electrolyte, said coating adhering sufficiently to said container so that fluids exuding through a puncture in said container are retained in a distention of said coating, and localized to the area immediately adjacent to said puncture.

4. A dry cell container having an adhesively sticking locally distensible coating on the side removed from the electrolyte, said coating adhering sufficiently to said container so that fluids exuding through a puncture in said container are retained in a distention of said coating, said fluids being localized to the area immediately adjacent to said puncture and said coating being resistant to the action of the dry cell electrolyte.

5. A zinc dry cell container having an adhesively sticking rubber exterior coating, said coating adhering sufficiently to said container so that fluids exuding through a puncture in said container are retained in a distention of said coating and localized to the area immediately adjacent to said puncture.

6. A zinc dry cell can having an adhesively sticking rubber exterior coating upon its side wall, said coating adhering sufficiently to said can so that fluids exuding through a puncture in said can are retained in a distention of said coating and localized to the area immediately adjacent to said puncture.

7. In a battery consisting of a plurality of serially connected individual dry cells, means for insulating said cells from each other comprising a permanent, locally distensible rubber coating forming an integral part of each of said individual dry cells.

In testimony whereof I affix my signature.

ARLIE W. SCHORGER.